United States Patent
Hayashi et al.

(10) Patent No.: US 8,104,385 B2
(45) Date of Patent: Jan. 31, 2012

(54) BRITTLE WORKPIECE SPLITTING SYSTEM AND BRITTLE WORKPIECE SPLITTING METHOD

(75) Inventors: Masakazu Hayashi, Ebina (JP); Shinji Nakata, Yokohama (JP); Susumu Yahagi, Yokohama (JP)

(73) Assignees: Shibaura Mechatronics Corporation, Yokohama-shi (JP); Kabushiki Kaisha Toshiba, Tokyo (JP)

( * ) Notice: Subject to any disclaimer, the term of this patent is extended or adjusted under 35 U.S.C. 154(b) by 1313 days.

(21) Appl. No.: 11/245,031

(22) Filed: Oct. 7, 2005

(65) Prior Publication Data
US 2006/0081101 A1    Apr. 20, 2006

(30) Foreign Application Priority Data

Oct. 8, 2004 (JP) .................. 2004-296215
Aug. 30, 2005 (JP) .................. 2005-249928

(51) Int. Cl.
*B26D 7/10* (2006.01)
*B23K 26/14* (2006.01)
*B26F 3/00* (2006.01)
*C03B 31/00* (2006.01)

(52) U.S. Cl. .................. 83/15; 219/121.67; 219/121.72; 219/121.84; 219/121.85; 225/2; 225/93.005; 225/93.5; 225/96; 65/111; 65/112; 65/174; 65/175; 65/176

(58) Field of Classification Search . 83/15; 219/121.72, 219/121.67, 121.84, 121.85; 225/2, 93.005, 225/93.5, 96; 65/111–112, 174–176
See application file for complete search history.

(56) References Cited

U.S. PATENT DOCUMENTS
3,739,963 A * 6/1973 Michalik .................. 225/2
(Continued)

FOREIGN PATENT DOCUMENTS
EP    0 872 303 A    10/1998
(Continued)

OTHER PUBLICATIONS
U.S. Appl. No. 11/624,414, filed Jan. 18, 2007, Yahagi, et al.

*Primary Examiner* — Henry Yuen
*Assistant Examiner* — Ket D Dang
(74) *Attorney, Agent, or Firm* — Oblon, Spivak, McClelland, Maier & Neustadt, L.L.P.

(57) ABSTRACT

The brittle workpiece splitting system 1 includes a substrate holding mechanism 10 for holding a substrate 51, and a processing unit 5 for splitting the substrate 51 held by the substrate holding mechanism 10 by a splitting process. The substrate holding mechanism 10 has an edge damper 12 adapted to clamp an edge part of the substrate 51 from the sides of the opposite surfaces of the edge part, and support members 19 for supporting the substrate 51 thereon at a predetermined height. The support members 19 are disposed on the side opposite the side of the edge damper 12 with respect to the intended split line 61 parallel to the edge part of the substrate 51. The edge damper 12 has an edge holder 15 on which the substrate 51 is seated, and a pressure bar 14 for pressing the substrate 51 against the edge holder 15 to hold the substrate 51 between the edge holder 15 and the pressure bar 14. Resin members 14a and 15a made of an elastic material having comparatively high rigidity are attached to parts, to be brought into contact with the substrate 51, of the pressure bar 14 and the edge holder 15, respectively. The support members 19 are made of a low-friction material to permit the horizontal movement of the substrate 51 during the splitting process.

14 Claims, 8 Drawing Sheets

U.S. PATENT DOCUMENTS

| | | | | |
|---|---|---|---|---|
| 4,175,684 A | * | 11/1979 | Butler | 225/2 |
| 4,258,648 A | * | 3/1981 | Leising et al. | 118/60 |
| 4,573,617 A | * | 3/1986 | Durkow | 225/96 |
| 5,154,334 A | * | 10/1992 | Dekker et al. | 225/2 |
| 5,984,159 A | * | 11/1999 | Ostendarp et al. | 225/93.5 |
| 6,501,047 B1 | * | 12/2002 | Xuan et al. | 219/121.69 |
| 2001/0008687 A1 | * | 7/2001 | Kollaja et al. | 428/220 |
| 2004/0208788 A1 | * | 10/2004 | Colton | 422/68.1 |

FOREIGN PATENT DOCUMENTS

| | | |
|---|---|---|
| JP | 62-123034 | 6/1987 |
| JP | 2-296745 | 12/1990 |
| TW | 461440 | 10/2001 |
| TW | 476737 | 2/2002 |
| TW | 520349 | 2/2003 |

* cited by examiner

BRITTLE WORKPIECE SPLITTING SYSTEM AND BRITTLE WORKPIECE SPLITTING METHOD

BACKGROUND OF THE INVENTION

1. Field of the Invention

The present invention relates to a brittle workpiece splitting system for splitting a substrate made of a hard, brittle material by locally heating the substrate to cause a crack in the substrate. More particularly, the present invention relates to a brittle workpiece splitting system capable of quickly achieving a splitting process for cutting off an edge part of a substrate in a high processing quality, and to a brittle workpiece splitting method to be carried out by the brittle workpiece splitting system. This patent application is based on application Nos. 2004-296215 and 2005-249928 the content of which are incorporated hereinto by reference.

2. Description of the Related Art

A conventional splitting method of splitting a planar substrate, such as a glass substrate or the like for a liquid crystal display panel or a plasma display panel, locally heats the substrate and cools the locally heated substrate. A crack is caused in the substrate by the agency of thermal stress (tensile stress) induced in the locally heated and locally cooled substrate and the substrate splits.

The conventional splitting method irradiates a part of a substrate mounted on a stage with a laser beam to locally heat the substrate so that a crack is caused in the substrate by the agency of a thermal stress (tensile stress) induced in the heated part. A heating point on which the laser beam falls to locally heat the substrate is moved along an intended split line to extend the crack in the substrate along the intended split line. A coolant is sprayed on the locally heated part to locally cool the substrate. Consequently, the thermal stress (tensile stress) induced in the locally cooled part can be increased and the growth of the crack can be promoted.

In this conventional splitting method, it is necessary to make the crack extend accurately in the substrate along the intended split line in order to accurately split the substrate.

In related art splitting methods proposed in JP-A Nos. 7-328781, 7-323384 and 2003-34545, controlled are irradiation conditions for irradiating a substrate with a laser beam and the positional relation between an irradiation point at which a laser beam falls and a cooling point to make a crack grow stably in the substrate.

The foregoing related art splitting methods need an expensive control system and an optical system to carry out complicated control operations for controlling irradiation with the laser beam and spraying the coolant on the substrate. Consequently, the prior art splitting methods need an expensive, complex apparatus.

A related art splitting method, other than the foregoing splitting methods, using an improved substrate holding mechanism to cause a crack in the substrate and to make the crack extend has been proposed. A related art splitting method disclosed in JP-A No. 2002-110589 causes a crack to extend linearly along an intended split line by holding parts of a substrate respectively on the opposite sides of the in tended split line by fixing jigs to rigidify the substrate so that the parts of the substrate are evenly rigidified. Abutting parts, which come into contact with the substrate, of the fixing jigs are made of rubber, namely, an elastic material having comparatively low elasticity.

The splitting method mentioned in JP-A No. 2002-110589 is able to make a crack extend accurately linearly in the substrate along the split line when the split line extends in a central part of the substrate. However, a problem that a crack extends along a meandering line arises when this related art splitting method is applied to a trimming process for cutting off an edge part of a substrate and the splitting method is unable to cause a crack to extend accurately linearly. This problem becomes more remarkable when the intended split line is close to an edge, namely, a free end, of the substrate and is at a short distance of, for example, about 10 mm from the edge. The term "accurate linear extension of the crack" concerns an order of (±) several tenth millimeters or below. The extension of the crack with a deviation in the range of about ±0.1 to about ±0.2 mm from the intended split line is accurate extension of the crack. The extension of the crack with a deviation in the range of about ±0.4 to about ±1 mm from the intended split line is inaccurate extension of the crack. More preferably, the deviation of the crack from the intended split line is about (±) several tens micrometers on the opposite sides of the intended split line. Refer to "JSME International Journal Series A, Vol. 68, No. 670, pp. 93" for further information about the accuracy of linearity.

SUMMARY OF THE INVENTION

The present invention has been made in view of the foregoing problems and it is therefore an object of the present invention to provide an inexpensive, simple brittle workpiece splitting system capable of quickly achieving a splitting process for cutting off an edge part of a substrate in a high processing quality, and to provide a brittle workpiece splitting method to be carried out by the brittle workpiece splitting system.

A brittle workpiece splitting system in a first aspect of the present invention for splitting a brittle substrate by locally heating the substrate to cause a crack in the substrate by an agency of thermal stress induced in the substrate includes: a substrate holding mechanism that holds a substrate; and a processing unit that splits the substrate held by the substrate holding mechanism by a splitting process that irradiates the substrate with a laser beam to locally heat the substrate; wherein the substrate holding mechanism and the processing unit move relative to each other so that a region in the substrate to be locally heated by the processing unit moves along an intended split line on the substrate, the substrate holding mechanism has an edge damper adapted to clamp an edge part of the substrate from both sides of the opposite surfaces of the edge part, and a support member for supporting the substrate thereon from a side of one surface of the substrate at a predetermined height, the support member being disposed on the side opposite the side of the edge damper with respect to the intended split line parallel to the edge part of the substrate, at least a part, to be brought into contact with the substrate, of the edge damper is made of an elastic material having comparatively high rigidity, and the support member supports the substrate so as to be horizontally movable for displacement in an extended plane of the substrate during the splitting process.

In the brittle workpiece splitting system in the first aspect of the present invention, it is preferable that the processing unit sprays a coolant on the locally heated region on the substrate to cool the locally heated region.

In the brittle workpiece splitting system in the first aspect of the present invention, it is preferable that the edge part to be clamped by the edge damper has a width of 10 mm or below.

In the brittle workpiece splitting system in the first aspect of the present invention, it is preferable that the elastic material has a Young's modulus in a range of ten to several thousands [MPa]. Preferably, the elastic material is a resin. Preferably, the resin contains a fluoro-resin.

In the brittle workpiece splitting system in the first aspect of the present invention, it is preferable that a part, to be brought into contact with the substrate, of the support member is made of a low-friction material to permit the horizontal movement of the substrate during the splitting process. A part, to be brought into contact with the substrate, of the support member may be provided with a deformable member that permits the horizontal movement of the substrate during the splitting process.

A brittle workpiece splitting method of splitting a brittle substrate by locally heating the substrate to cause a crack in the substrate by an agency of thermal stress induced in the substrate in a second aspect of the present invention includes: a holding step of holding a substrate to be subject to a splitting process by a substrate holding mechanism; and a splitting step of splitting the substrate held by the substrate holding mechanism by irradiating the substrate with a laser beam to locally heat the substrate and by moving a heated region on the substrate along an intended split line extending along an edge part of the substrate; wherein the substrate holding mechanism that holds the substrate in the holding step has an edge damper adapted to clamp the edge part of the substrate from both sides of the opposite surfaces of the edge part, and a support member for supporting the substrate thereon from a side of one surface of the substrate at a predetermined height, the support member being disposed on the side opposite the side of the edge damper with respect to an intended split line parallel to the edge part of the substrate, at least a part, to be brought into contact with the substrate, of the edge damper is made of an elastic material having comparatively high rigidity, and the support member supports the substrate so as to be horizontally movable for displacement in an extended plane of the substrate during the splitting step.

In the brittle workpiece splitting method in the second aspect of the present invention, it is preferable that a coolant is sprayed on the locally heated region on the substrate to cool the locally heated region in the splitting step.

In the brittle workpiece splitting method in the second aspect of the present invention, it is preferable that the edge part to be clamped by the edge damper has a width of 10 mm or below.

In the brittle workpiece splitting method in the second aspect of the present invention, it is preferable that the elastic material has a Young's modulus in a range of ten to several thousands [MPa]. Preferably, the elastic material is a resin. Preferably, the resin contains a fluoro-resin.

In the brittle workpiece splitting method in the second aspect of the present invention, it is preferable that a part, to be brought into contact with the substrate, of the support member is made of a low-friction material to permit the horizontal movement of the substrate during the splitting process. A part, to be brought into contact with the substrate, of the support member may be provided with a deformable member that permits the horizontal movement of the substrate during the splitting process.

According to the present invention, the part made of the elastic material having comparatively high rigidity of the edge damper is brought into contact with the opposite surfaces of the edge part of the substrate to hold the substrate, and the substrate is supported on the support member so as to be horizontally movable for displacement in an extended plane of the substrate during the splitting step. Therefore, the edge part of the substrate can be quickly cut off in a high processing quality. Particularly, the present invention does not need to carry out complicated control operations for irradiating the substrate with the laser beam and hence does not need any expensive control system and any expensive optical system. Consequently, the brittle workpiece splitting system of the present invention is simple and inexpensive.

DESCRIPTION OF THE EMBODIMENTS

A brittle workpiece splitting system in a preferred embodiment of the present invention will be described with reference to the accompanying drawings.

The constitution of the brittle workpiece splitting system in a preferred embodiment of the present invention will be described with reference to FIGS. 1 to 4.

Figure 1:
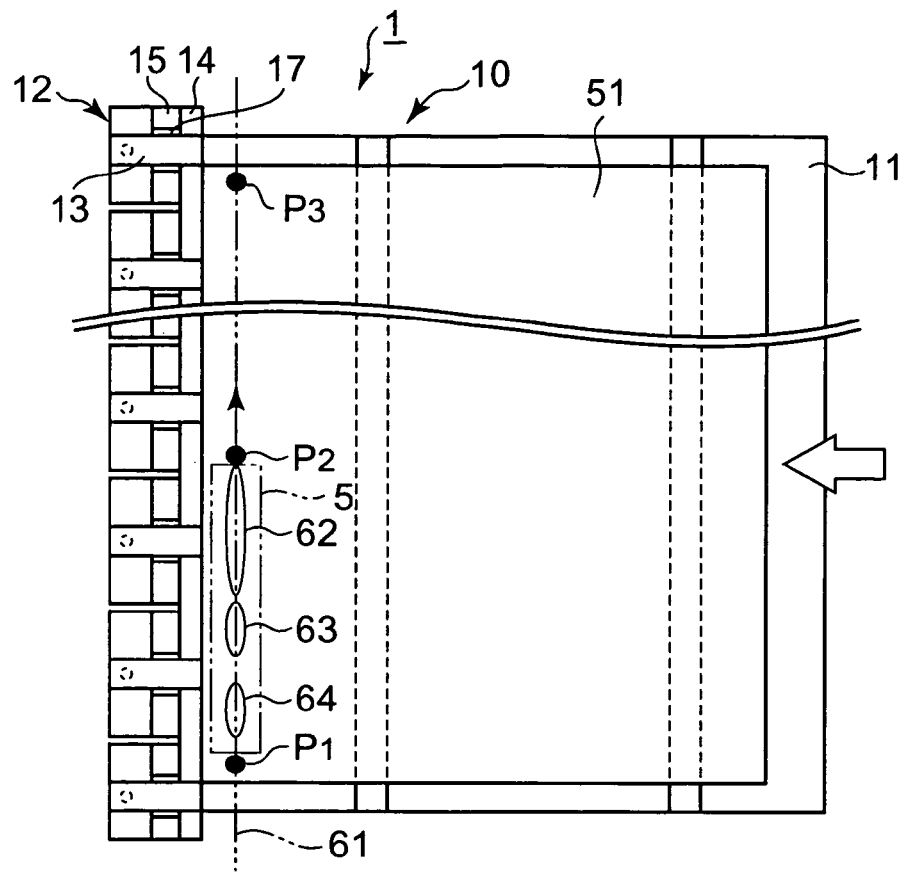
FIG. 1 is a plan view of a brittle workpiece splitting system in an embodiment of the present invention.
Figure 2:
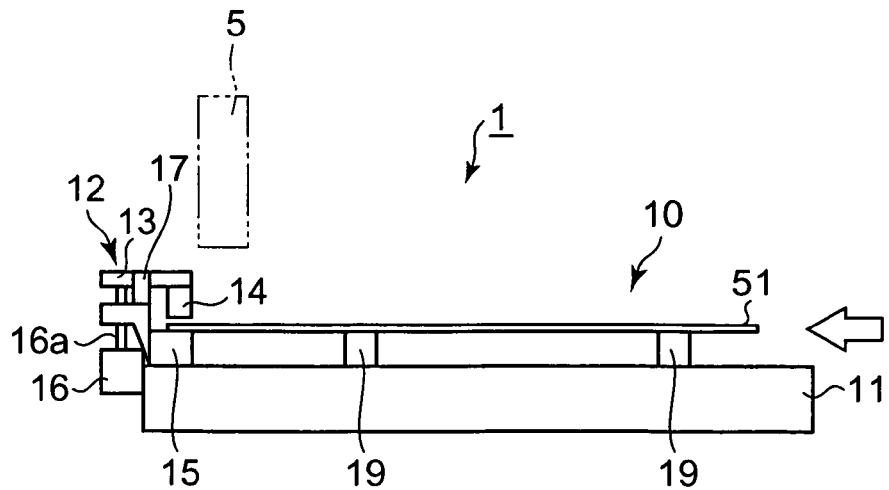
FIG. 2 is a side elevation of a substrate holding mechanism included in the brittle workpiece splitting system shown in FIG. 1.

Referring to FIGS. 1 and 2, a brittle workpiece splitting system 1 carries out a splitting process of locally heating a substrate 51 made of a brittle material, such as glass, to cause a crack in the substrate 51 by thermal stress induced in the substrate 51. The brittle workpiece splitting system 1 has a substrate holding mechanism 10 for holding the substrate 51, and a processing unit 5 for processing the substrate 51 by the splitting process. It is supposed herein that the substrate 51 to be processed by the brittle workpiece splitting system 1 is a glass substrate.

The substrate holding mechanism 10 has an edge damper 12 adapted to clamp an edge part of the substrate 51 from both sides of the opposite surfaces of the edge part, and support members 19 for supporting an lower surface of the substrate 51 held by the edge damper 12 thereon at a predetermined height. The support members 19 are disposed on one side opposite the side of the edge damper 12 with respect to an intended split line 61 parallel to an edge of the substrate 51. The edge damper 12 and the support members 19 are fixedly held on a base 11. The height of the edge damper 12 and that of the support members 19 are determined such that the substrate 51 clamped by the edge damper 12 and supported on the support members 19 is parallel to the surface of the base 11.

The edge damper 12 has an edge holder 15 on which the substrate 51 is seated, and a pressure bar 14 for pressing the substrate 51 against the edge holder 15 to hold the substrate 51 between the edge holder 15 and the pressure bar 14.

Resin members 14a and 15a are attached to the lower surface of the pressure bar 14 and the upper surface of the edge holder 15, respectively. The resin members 14a and 15a are made of an elastic material having comparatively high rigidity. Preferably, the elastic material has a Young's modulus between 10 and several thousands [MPa] (1 MPa=1×$10^6$N/m$^2$). The resin members 14a and 15a are made of the same material. Preferable materials for the resin members 14a and 15a are fluoro-resins such as PTFE resins (Teflon®), PCTFE resins and PFA resins, polyacetal resins (POM resins) and MC nylons. The respective Young's moduli of those typical materials are between 0.3 and 0.6 GPa (1 GPa=1×$10^{12}$N/m$^2$) for PTFE resins and between 0.4 and 1.3 GPa for polyethylene resins. The Young's modulus of iron (steels) is between 200 and 220 GPa, while the Young's moduli of copper and rubber are 130 GPa and several megapascals, respectively.

Preferably, the resin members 14a and 15a have a thickness between several tenths millimeters and 10 mm. If the resin members 14a and 15a are excessively thin, the substrate 51 are liable to be damaged and a part held between the resin members 14a and 15a of the substrate 51 is deformed insufficiently. If the resin members 14a and 15a are excessively thick, a part held between the resin members 14a and 15a of the substrate 51 deforms excessively and parts of the substrate 51 respectively on the opposite sides of the split line 61 are deformed asymmetrically.

The pressure bar 14 is an integral rigid member capable of pressing the entire length of an edge part of the substrate against 51 against the edge holder 15. When the pressure bar 14 is held at its home position, the pressure bar 14 is at a position above by about several millimeters from the upper surface of the substrate 51. Preferably, the pressure bar 14 is made of a metal having a Young's modulus of 100 GPa or above. Preferably, the pressure bar 14 has an abutting width of 10 mm or below. More specifically, suppose that an edge part of 10 mm in width of the substrate 51 is to be cut off, it is preferable that an edge part of about 5 mm in width is held between the pressure bar 14 and the edge holder 15. A part of 5 mm in width of an edge part (10 mm in width) of the substrate 51 projecting from the intended split line 61 is held between the pressure bar 14 and the edge holder 15.

Each of levers 13 supported by a support mechanism 17 has a first end connected to an upper part of the pressure bar 14, and a second end combined with a load sensor 18. An actuating rod 16a included in a motor 16 is connected to the load sensor 18. The lever 13 turns about a fulcrum $N_4$ when a point $N_1$ of application in the second end of the lever 13 is moved upward. The motor 16 is provided with a rotor, not shown, and a reduction gear, not shown. A signal is given to the motor 16 to rotate the rotor. The reduction gear converts the rotation of the rotor into a linear motion of the actuating rod 16a. A control circuit, not shown, performs a feedback control operation using an input signal given to the motor 16 and an output signal provided by the load sensor 18 to apply a predetermined force $W_1$ to the second end (point $N_1$ of application) of the lever 13.

When the lever 13 is thus turned about the fulcrum $N_4$, the first end (point $N_2$ of loading) of the lever 13 moves downward to push the pressure bar 14. Then, the pressure bar 14 is moved downward to hold the substrate 51 between the pressure bar 14 and the edge holder 15. A force produced by multiplying the force $W_1$ applied to the second end (point $N_1$ of application) of the lever 13 by the leverage of the lever 13 acts on the point $N_2$ of loading in the first end of the lever 13. Consequently, a desired force is applied to a loading point $N_3$ in an edge part of the substrate 51.

Since the distance between the fulcrum $N_4$ and the point $N_2$ of loading of the lever 13 is longer than the moving distance of the point $N_2$ of loading, the pressure lever 14 is pushed substantially perpendicularly to the surface of the substrate 51. Consequently, the resin member 14a attached to the pressure bar 14 comes into substantially uniform contact with the upper surface of the substrate 51 to uniformly press the substrate 51.

There are several levers 13 for pressing the pressure bar 14, which are arranged on a straight line parallel to the intended split line 61 to apply force to parts corresponding to the levers 13 of the pressure bar 14. Thus, the pressure bar 14 is able to apply pressure uniformly to the substrate 51. Pressure can be irregularly applied to the substrate 51 by irregularly arranging the pressing points to which the levers 13 apply pressure. For example, a pressure higher or lower than a pressure applied to a part of the edge part of the substrate 51 corresponding to a middle processing point $P_2$ shown in FIG. 1 can be applied to parts of the edge part of the substrate 51 respectively corresponding to a processing start point $P_1$ and a processing end point $P_3$, respectively.

The support members 19 support the substrate 51 thereon so as to be horizontally movable for displacement in an extended plane of the substrate 51 during a splitting process. At least a part, to be brought into contact with the substrate 51, of each of the support members 19 is made of a low-friction material to permit the horizontal movement of the substrate 51 during the splitting process. Preferably, the upper end surface, to be brought into contact with the substrate 51, of each support member 19 is finished by polishing or is coated with a resin to reduce friction between the upper end surface of the support member 19 and the substrate 51. When the friction between the upper end surfaces of the support members 19 and the substrate 51 made of glass or the like is thus reduced, the substrate 51 can smoothly slide horizontally relative to the support members 19. Preferably resins for coating the upper end surfaces of the support members 19 are fluoro-resins such as PTEF resins (e.g., Teflon®), PCTFE resins and PFA resins.

The processing unit 5 for processing the substrate 51 held by the substrate holding mechanism 10 by the splitting process will be described.

Figure 4:
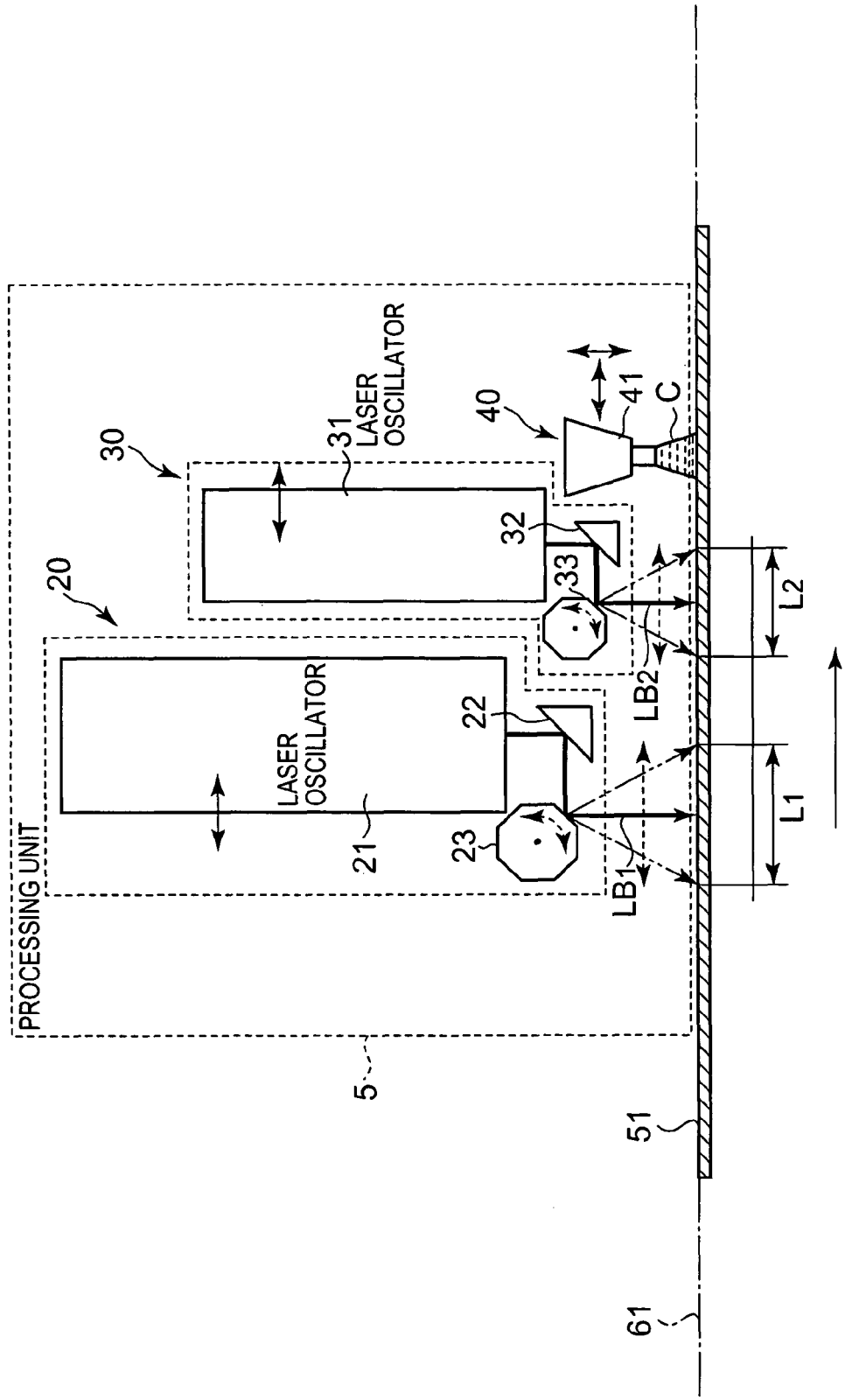
FIG. 4 is a side elevation of a processing unit included in the substrate holding mechanism included in the brittle workpiece splitting system shown in FIGS. 1 and 2.

Referring to FIG. 4, the processing unit 5 includes a preheating unit 20, a heating unit 30 and a cooling unit 40. The units 20, 30 and 40 are movable relative to the substrate 51 above the substrate 51 along the intended split line 61. The preheating unit 20, the heating unit 30 and the cooling unit 40 are arranged in that order with respect to the moving direction of the substrate 51 on a straight line.

The preheating unit 20 irradiates the substrate 51 with a laser beam $LB_1$ to heat the substrate locally. The preheating unit 20 has a laser oscillator 21, such as a $CO_2$ laser, having an output capacity on the order of 200 W, a reflecting mirror 22 for reflecting a laser light emitted by the laser oscillator 21, and a polygonal rotating mirror 23 for scanning the substrate 51 with the laser light reflected by the reflecting mirror 22. The laser light emitted by the laser oscillator 21 is reflected onto the polygonal rotating mirror 23 by the reflecting mirror 22, and then the polygonal rotating mirror 23 reflects the laser light onto the substrate 51 to scan a range of a length $L_1$ repeatedly along the intended split line 61 to produce a laser beam $LB_1$ having a linear spot. The laser beam $LB_1$ irradiates the substrate 51 in a linear pattern 62 extending along the intended split line 61 as shown in FIG. 1.

The heating unit 30 heats the preheated part of the substrate 51 locally heated by the preheating unit 20 with a laser beam $LB_2$ for local heating. The heating unit 30 has a laser oscillator 31, such as a $CO_2$ laser, having an output capacity in the range of tens to hundred and several tens watts, a reflecting mirror 32 for reflecting a laser light emitted by the laser oscillator 31, and a polygonal rotating mirror 33 for scanning the substrate 51 with the laser light reflected by the reflecting mirror 32. The laser light emitted by the laser oscillator 31 is reflected onto the polygonal rotating mirror 33 by the reflecting mirror 32, and then the polygonal rotating mirror 33 reflects the laser beam $LB_2$ onto the substrate 51 to scan a range of a length $L_2$ repeatedly along the intended split line 61 to produce a laser beam $LB_2$ having a linear spot. The laser beam $LB_2$ irradiates the substrate 51 in a linear pattern 63 extending along the intended split line 61 as shown in FIG. 1.

The cooling unit 40 sprays a coolant C on the substrate 51 locally heated by the heating unit 30 to cool the locally heated part of the substrate 51. The coolant C may be water, a mist (i.e., a mixture of water and a gas), a gas (e.g., nitrogen gas), fin particles (e.g., carbon dioxide particles), a liquid (e.g., alcohol or atomized alcohol). The cooling unit 40 has a cooling nozzle 41 for spraying the coolant C on the surface of the substrate 51. The coolant C sprayed through the cooling nozzle 41 spreads in a predetermined pattern 64 on the substrate 51 as shown in FIG. 1.

The substrate holding mechanism 10 and the processing unit 5 including the preheating unit 20, the heating unit 30 and the cooling unit 40 are movable relative to each other. Consequently, the pattern 62 of the locally preheated region, the pattern 63 of the locally heated region and the pattern 64 of the locally cooled region shift along the intended split line 61 on the substrate 51. The preheating unit 20, the heating unit 30 and the cooling unit 40 of the processing unit 5 are mounted on a moving stage, not shown, for moving the preheating unit 20, the heating unit 30 and the cooling unit 40 parallel to the surface of the substrate 51. The preheating unit 20, the heating unit 30 and the cooling unit 40 can be arranged above the substrate 51 at proper intervals in alignment with the intended split line 61.

The operation of the brittle workpiece splitting system 1 will be described.

Figure 3:
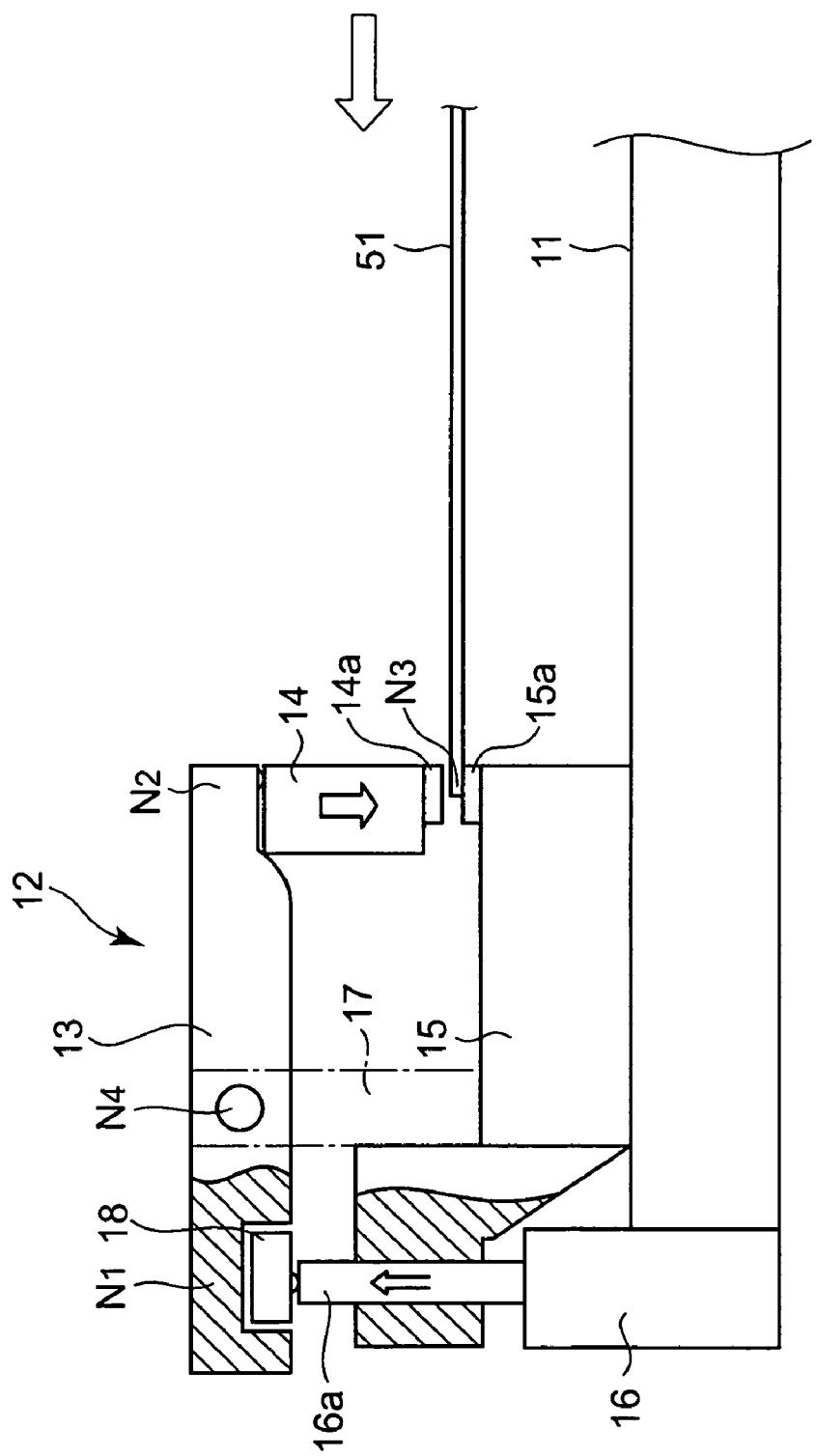
FIG. 3 is an enlarged side elevation of an edge damper included in the substrate holding mechanism included in the brittle workpiece splitting system shown in FIGS. 1 and 2.

The substrate 51 is carried in the direction of the arrow shown in FIGS. 1 to 3 to the substrate holding mechanism 10 of the brittle workpiece splitting system 1 shown in FIGS. 1 to 4. The substrate 51 is seated on the support members 19 with an edge part thereof placed in a space between the edge holder 15 and the pressure bar 14 of the edge damper 12.

Then, the substrate 51 held by the substrate holding mechanism 10 is held between the pressure bar 14 and the edge holder 15 of the edge damper 12. More specifically, the rotors, not shown, of the motors 16 are rotated to advance the rods 16a linearly to apply force through the load sensors 18 to the points $N_1$ of application in the second ends of the levers 13. Consequently, the levers 13 supported by the support mechanism 17 turn about fulcrums $N_4$, respectively, and the points $N_2$ of loading in the first ends of the levers 13 move downward to push the pressure bar 14. Then, the pressure bar 14 moves downward to hold an edge part of the substrate 51 between the pressure bar 14 and the edge holder 15. Thus the substrate 51 is positioned at a predetermined position on the substrate holding mechanism 10.

Subsequently, the processing unit 5 is moved relative to the substrate holding mechanism 10 to position the processing unit 5 above the intended split line 61 on the substrate 51 positioned on the substrate holding mechanism 10. The preheating unit 20, the heating unit 30 and the cooling unit 40 of the processing unit 5 are arranged beforehand so that the preheating unit 20, the heating unit 30 and the cooling unit 40 are arranged on a straight line at proper intervals in alignment with the intended split line 61 when the processing unit 5 is positioned above the intended split line 61 on the substrate 51.

Then, a small crack is formed in an end part $P_1$ of the substrate 51 by a initial cracking unit, not shown, and then the processing unit 5 is moved relative to the substrate holding mechanism 10 to move the preheating unit 20, the heating unit 30 and the cooling unit 40 of the processing unit 5 in that order along the intended split line 61 relative to the substrate 51.

As shown in FIGS. 1 and 4, the preheating unit 20 moves first along the intended split line 61 above the substrate 51 to irradiate the substrate 51 linearly with the laser beam $LB_1$. Consequently, a region in the substrate 51 is heated locally at a predetermined temperature in the range of about 30 to about 200° C. The laser light emitted by the laser oscillator 21 is reflected onto the polygonal rotating mirror 23 by the reflecting mirror 22, and then the polygonal rotating mirror 23 reflects the laser light onto the substrate 51 to scan the range of the length $L_1$ repeatedly along the intended split line 61 to produce a laser beam LB1 in a linear pattern 62.

Then, the heating unit 30 moves relative to the substrate 51 locally preheated by the preheating unit 20 along the intended split line 61. The heating unit 30 irradiates a linear region in the substrate 51 narrower than the linear region locally preheated by the preheating unit 20 with the laser beam $LB_2$ to heat the region locally at a predetermined temperature in the range of about 100 to about 400° C. The laser light emitted by the laser oscillator 31 is reflected onto the polygonal rotating mirror 33 by the reflecting mirror 32, and then the polygonal rotating mirror 33 reflects the laser light onto the substrate 51 to scan the range of the length $L_2$ repeatedly along the intended split line 61 to produce a laser beam $LB_2$ in a linear pattern 63.

Then, the cooling unit 40 moves relative to the substrate 51 locally heated by the heating unit 30 along the intended split line 61. The cooling unit 40 sprays the coolant C on a linear region in the substrate 51 substantially equal in size to the linear region locally heated by the heating unit 30 to locally cool the heated region in the substrate 51. The coolant C is sprayed in a predetermined patter 64 on the surface of the substrate 51 through the cooling nozzle 41.

Thus, the part of the substrate 51 on the intended split line 61 is preheated by the preheating unit 20, is heated by the heating unit 30 and is cooled by the cooling unit 30 sequentially. Consequently, a crack is caused mainly by a thermal stress (tensile stress) induced in the substrate 51 by heating, and a tensile stress induced in the substrate 51 by cooling. The crack extends along the intended split line 61 as the preheating unit 20, the heating unit 30 and the cooling unit 40 moves relative to the substrate 51 along the intended split line 61.

Figure 5:
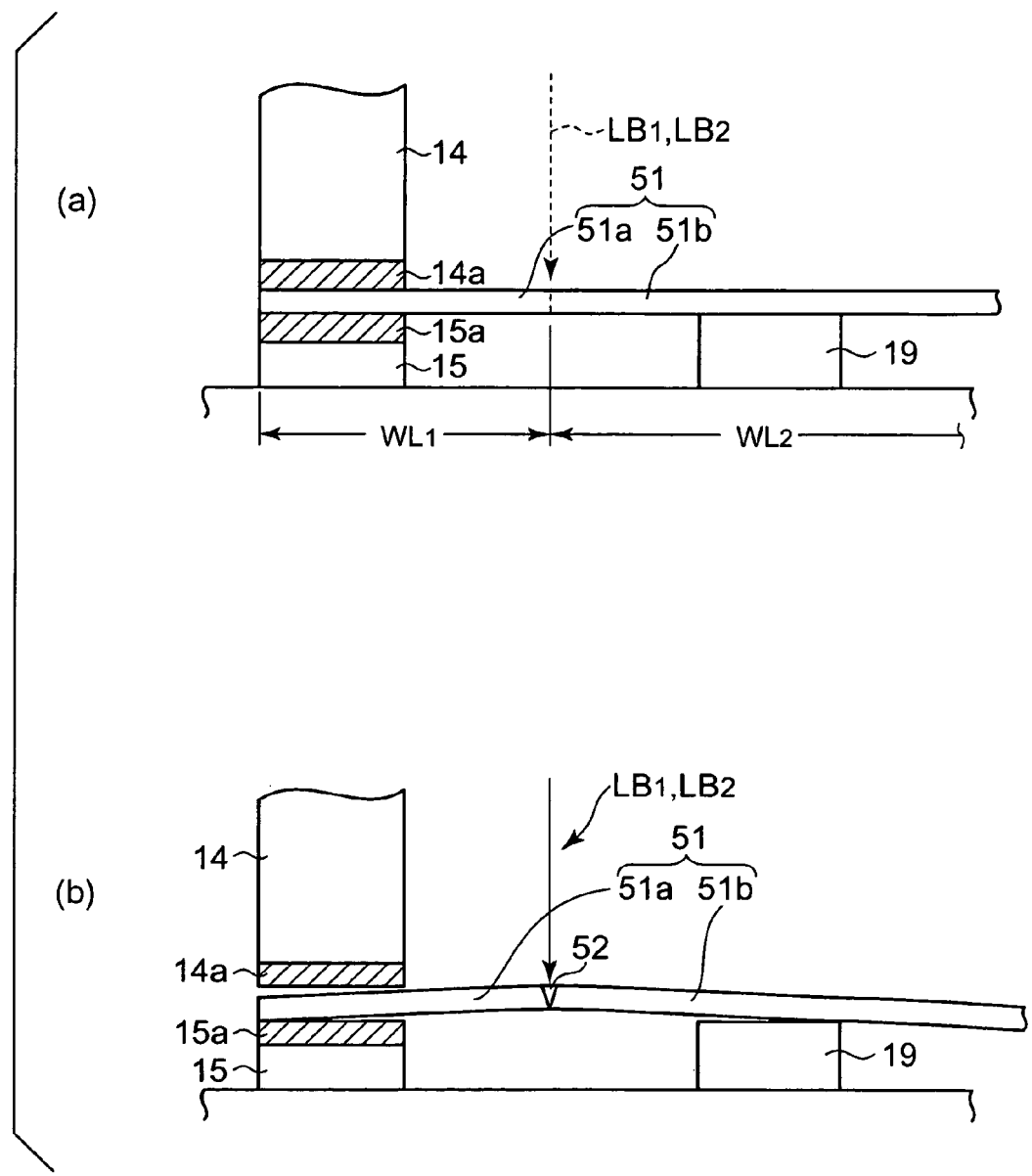
FIG. 5 is a side elevation of assistance in explaining a splitting process of processing a substrate by the brittle workpiece splitting system shown in FIGS. 1 to 4.

More specifically, as shown in FIGS. 5(a) and 5(b), when a part of the substrate 51 is heated locally with the laser beams $LB_1$ and $LB_2$ emitted respectively by the preheating unit 20 and the heating unit 30, the heated part undergoes thermal expansion. Consequently, the heated part rises and the substrate 51 deforms such that the crack expands laterally. The width $WL_1$ of an outer part 51a of the substrate 51 on the outer side (on the left-hand side as viewed in FIG. 5(a)) of a part irradiated with the laser beams $LB_1$ and $LB_2$ is narrower than the width $WL_2$ of an inner part 51b of the substrate 51 on the inner side (on the right-hand side, as viewed in FIG. 5(a)) of the part irradiated with the laser beams $LB_1$ and $LB_2$. Therefore, the outer part 51a deforms more greatly than the inner part 51b as shown in FIG. 5(b).

The edge part, namely, a portion of the outer part 51a, of the substrate 51 is held between the resin members 14a and 15b made of the elastic material having comparatively high rigidity and attached to the pressure bar 14 and the edge holder 15 of the damper 12. The resin members 14a and 15a made of such an elastic material are capable of suppressing the deformation of the edge part of the substrate 51 in a plurality of directions more effectively than elastic members made of a material having comparatively low rigidity, such as rubber. Thus, the outer part 51a and the inner part 51b of the substrate 51 deform substantially equally and the asymmetrical deformation of the outer part 51a and the inner part 51b can be suppressed.

Figure 6:
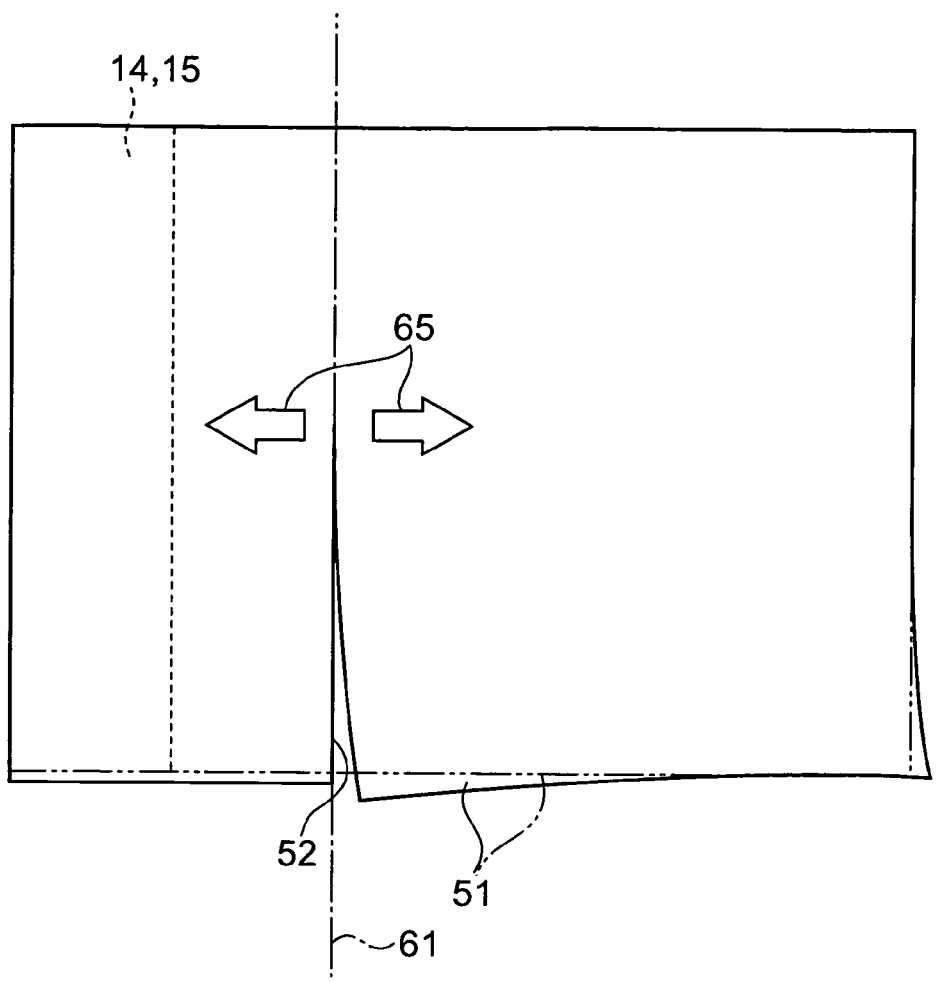
FIG. 6 is a plan view of assistance in explaining a splitting process of processing a substrate by the brittle workpiece splitting system shown in FIGS. 1 to 4.

Irradiation of the substrate 51 with the laser beams $LB_1$ and $LB_2$ induces a tensile stress 65 and causes thermal expansion of the substrate 51 as shown in FIG. 6. The tensile stress 65 and the thermal expansion of the substrate 51 tend to cause the outer part 51a and the inner part 51b to deform longitudinally, i.e., in a direction parallel to the intended split line 61, and so as to separate from each other as shown in FIG. 6. In FIG. 6, the substrate 51 before being subjected to the splitting process is indicated by imaginary lines and the substrate 51 after being subjected to the splitting process is indicated by solid lines.

The brittle workpiece splitting system 1 holds the edge part, namely, a portion of the outer part 51a, of the substrate 51 between the resin members 14a and 15b made of the elastic material having comparatively high rigidity and attached to the pressure bar 14 and the edge holder 15 of the damper 12. Therefore, the deformation of the outer part 51a of the substrate 51 can be very effectively suppressed. The inner part 51b of the substrate 51 is supported on the support members 19 made of a low-friction material to permit the horizontal movement of the substrate 51 during the splitting process. Therefore, the inner part 51b of the substrate 51 is able to slide horizontally on the support members 19 and is able to deform longitudinal in a direction parallel to the intended split line 61 and so as to move perpendicularly to the intended split line 16 away from the outer part 51a. Consequently, the crack 52 in the substrate 51 is able to extend accurately along the intended split line 61 on the substrate 51.

The brittle workpiece splitting system 1 presses the resin members 14a and 15b made of an elastic material having comparatively high rigidity and attached respectively to the pressure bar 14 and the edge holder 15 of the edge damper 12 against the upper and the lower surface of the edge part of the substrate 51 to hold the substrate 51, and supports the substrate 51 on the support members 19 made of a low-friction material so as to permit the horizontal movement of the substrate 51 during the splitting process. Therefore, a splitting process for cutting off an edge part of, for example, 10 mm or below in width of the substrate 51 can be quickly achieved in a high processing quality. The brittle workpiece splitting system 1 embodying the present invention does not need complicated control operations like those needed by the conventional brittle workpiece splitting method for controlling irradiation using the laser beam. Thus, the brittle workpiece splitting system 1 does not need any expensive control system and any expensive optical system and, therefore, the brittle workpiece splitting system 1 is simple in construction and inexpensive.

Figure 7:
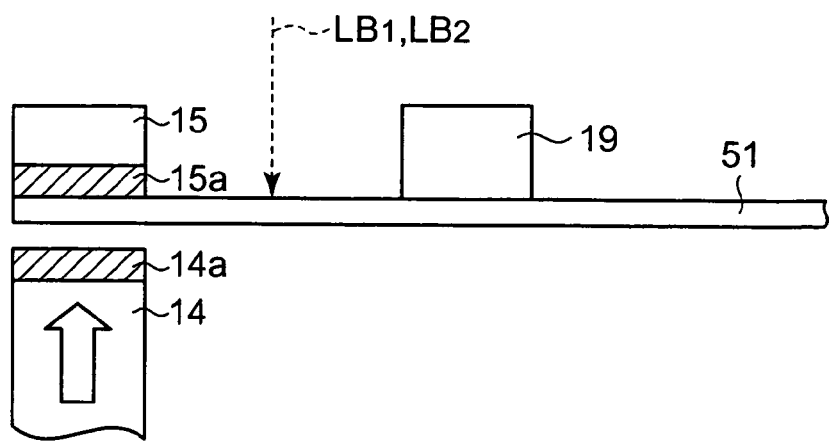
FIG. 7 is a schematic view of a brittle workpiece splitting system in a first modification of the brittle workpiece splitting system shown in FIGS. 1 to 4.

The brittle workpiece splitting system 1 in this embodiment supports the lower surface of the substrate 51 on the edge holder 15 of the edge damper 12 and the support members 19 and presses the upper surface of the substrate 51 against the edge holder 15 by the pressure bar 14 of the edge damper 12. The substrate 51 may be held by a method other than that by which the brittle workpiece splitting system 1 holds the substrate. For example, the edge holder 15 of the edge damper 12 and the support members 19 may be disposed on the side of the upper surface of the substrate 51 and the pressure bar 14 of the damper 12 may be disposed on the side of the lower surface of the substrate 51 as shown in FIG. 7 and the edge part of the substrate 51 may be held between the pressure bar 14 and the edge holder 15 of the edge clapper 12.

Figure 8:
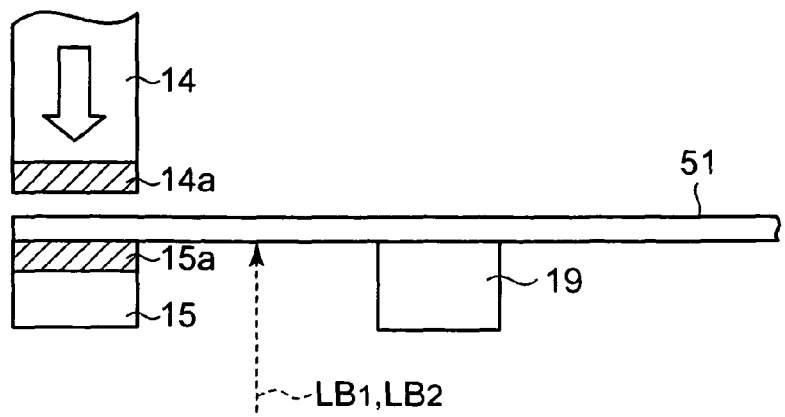
FIG. 8 is a schematic view of a brittle workpiece splitting system in a second modification of the brittle workpiece splitting system shown in FIGS. 1 to 4.

The brittle workpiece splitting system 1 holds the substrate 51 by the edge damper 12 including the pressure bar 14 and the edge holder 15 and supports the substrate 51 on the support members 19, and projects the laser beams $LB_1$ and $LB_2$ from the side of the upper surface of the substrate 51. The laser beams $LB_1$ and $LB_2$ may be projected from the side of the lower surface of the substrate 51 held by the edge damper 12 including the pressure bar 14 and the edge holder 15 and supported on the support members 19, as shown in FIG. 8.

Figure 9:
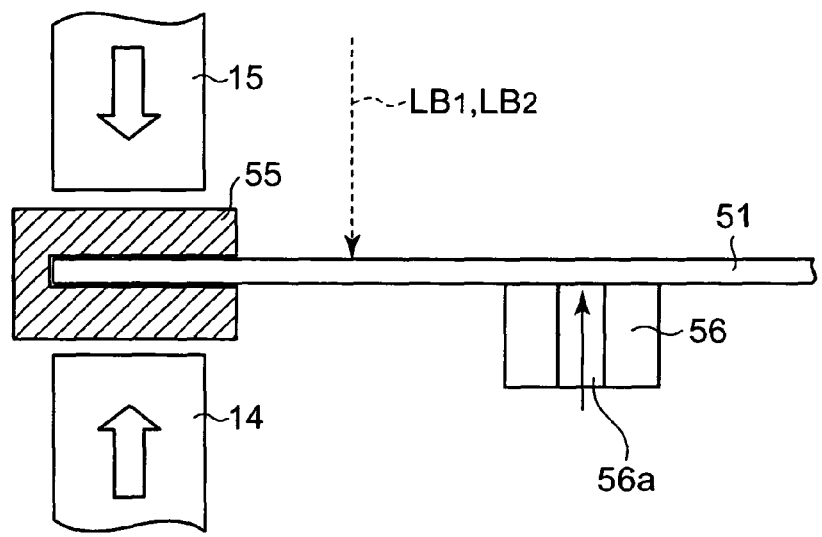
FIG. 9 is a schematic view of a brittle workpiece splitting system in a third modification of the brittle workpiece splitting system shown in FIGS. 1 to 4.
Figure 10:
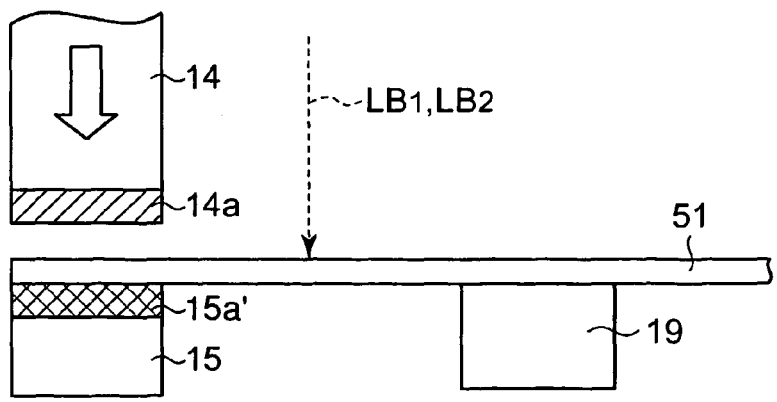
FIG. 10 is a schematic view of a brittle workpiece splitting system in a fourth modification of the brittle workpiece splitting system shown in FIGS. 1 to 4.

The brittle workpiece splitting system 1 holds the edge part of the substrate 51 between the resin member 14a attached to the pressure bar 14 and the resin member 15a attached to the edge holder 15. A resin member 55 provided with a groove may be put on the edge part of the substrate 51 so that the upper and the lower wall thereof are in contact with the upper and the lower surface of the substrate 51 as shown in FIG. 9, and the resin member 55 may be pressed upward and downward by the pressure bar 14 and the edge holder 15. Although the brittle workpiece splitting system 1 supports the substrate 51 on the support members 19 made of a low-friction material to permit the horizontal movement of the substrate 51 during the splitting process, the substrate 51 may be supported in place by a pneumatic support device 56 that blows air or a gas, such as nitrogen gas or oxygen gas, through an air jet hole 56a against the substrate 51 as shown in FIG. 9. The end surfaces, to be brought into contact with the substrate 51, of the support members 19 may be formed in a spherical or cylindrical shape.

Although the resin members 14a and 15a of the brittle workpiece splitting system 1 are made of the same material, the resin members 14a and 15a may be made, respectively, of different materials respectively having different Young's moduli in the range of 100 to several thousands [MPa]

Figure 11:
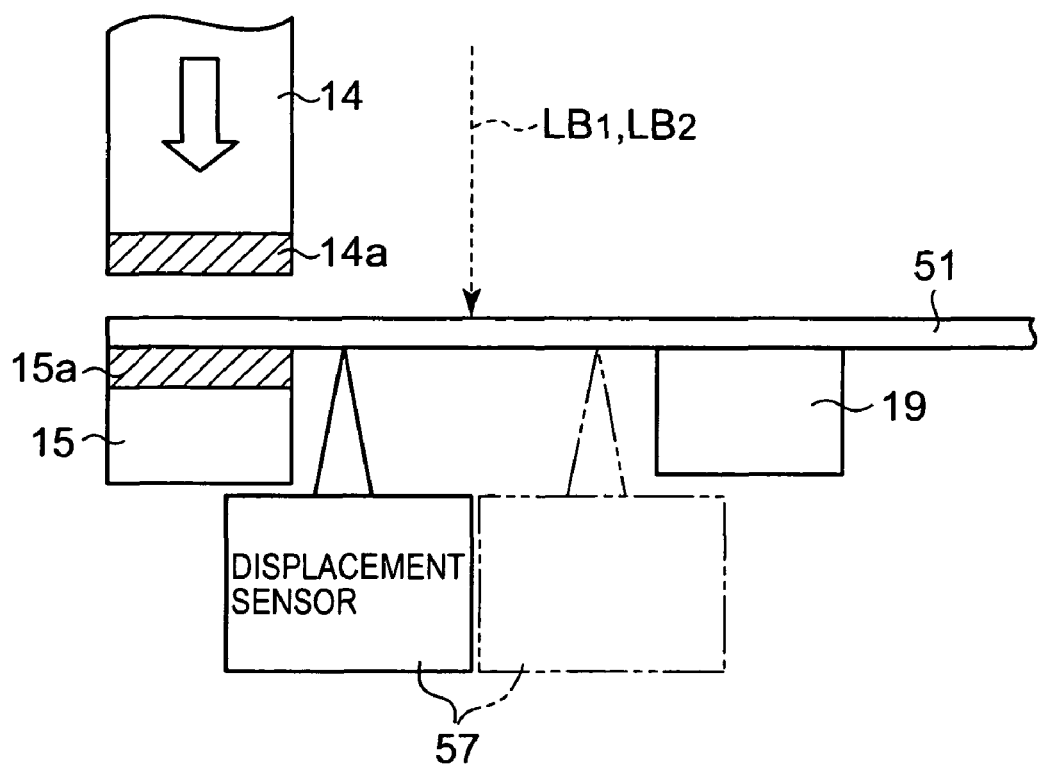
FIG. 11 is a schematic view of a brittle workpiece splitting system in a fifth modification of the brittle workpiece splitting system shown in FIGS. 1 to 4.

Although the brittle workpiece splitting system 1 applies a predetermined pressure to the upper surface of the substrate 51 by the pressure bar 14 of the edge damper 12, a displacement sensor 57 for measuring the displacement of the substrate 51 may be disposed above or below the substrate 51 as shown in FIG. 11, and pressure to be applied to the substrate 51 by the pressure bar 14 may be controlled on the basis of a measurement obtained by the displacement sensor 57. The displacement sensor 57 may be of either a contact type or a noncontact type. The working position of the displacement sensor 57 does not need to be in the solid line position (on the left-hand side as viewed in FIG. 11) of the intended split line as shown in FIG. 11 and may be in the imaginary line position (on the right-hand side as viewed in FIG. 11) of the intended spit line 61.

Figure 12:
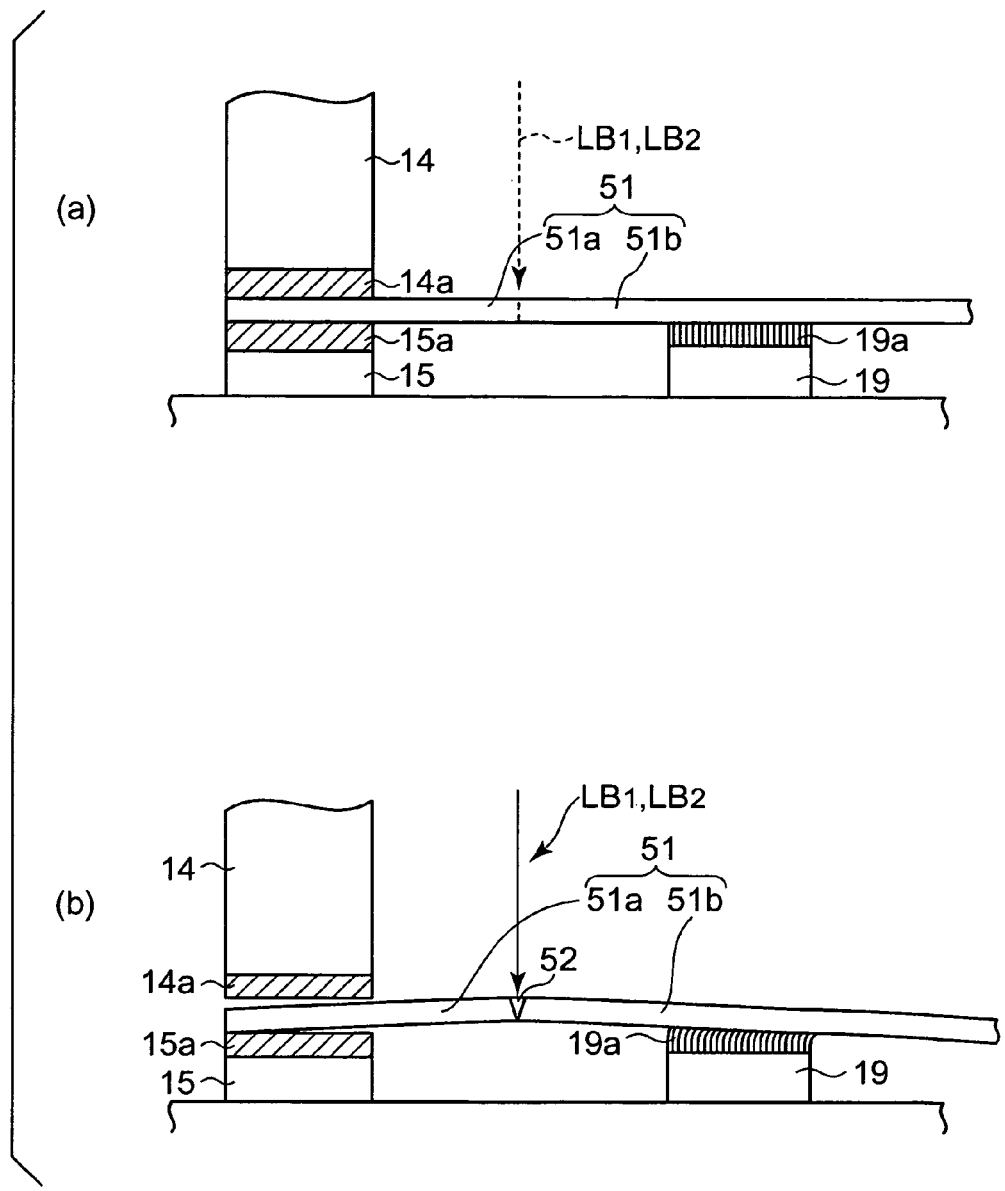
FIG. 12 is a schematic view of a brittle workpiece splitting system in a sixth modification of the brittle workpiece splitting system shown in FIGS. 1 to 4.

The brittle workpiece splitting system 1 is provided with the support members 19 made of a low-friction material and capable of permitting the horizontal movement of the substrate during the splitting process to permit the substrate 51 to slide horizontally in an extended plane of the substrate 51 on the support members 19. However, soft, deformable members 19a made of an elastic material may be attached to the upper ends of the support members 19 so as to come into contact with the substrate 51 as shown in FIG. 12(a). The soft, deformable members 19a deform to permit the substrate 51 to move horizontally in a horizontal plane of the substrate 51 during the splitting process as shown in FIG. 12(b).

Although the brittle workpiece splitting system embodying the present invention has been described as applied to cutting off an edge part of the single glass substrate 51, the brittle workpiece splitting system embodying the present invention is capable of quickly achieving a splitting process for cutting off an edge part of a liquid crystal panel formed by sealing a liquid crystal in a space defined by two glass substrates and sealed by a sealing member in a high processing quality and of quickly achieving a splitting process for cutting brittle substrates other than the liquid crystal panel in a high processing quality.

What is claimed is:

1. A brittle workpiece splitting system for splitting a substrate that is brittle by locally heating the substrate to cause a crack in the substrate via thermal stress induced in the substrate, said brittle workpiece splitting system comprising:
    a substrate holding mechanism that holds the substrate; and
    a processing unit that splits the substrate held by the substrate holding mechanism by irradiating the substrate with a laser beam to locally heat the substrate,
    wherein the substrate holding mechanism and the processing unit move relative to each other so that a region of the substrate to be locally heated by the processing unit moves along an intended split line on the substrate,
    wherein the substrate holding mechanism includes
        an edge clamper adapted to clamp an edge part of the substrate on opposite surfaces of the edge part, and
        a support member for supporting the substrate thereon from a surface of the substrate at a predetermined height, the support member being disposed on a first side of the surface of the substrate that is opposite a second side of the surface of the substrate whereon the edge clamper is clamped, the first and second sides of the substrate being opposite each other with respect to the intended split line, which is parallel to the edge part of the substrate,
    wherein at least a part of the edge clamper, which contacts the substrate, includes an elastic material having high rigidity and a Young's modulus ranging from 300 MPa to 1300 MPa,
    wherein a part of the support member, which contacts the substrate, includes a plurality of deformable members that elastically deforms horizontally to permit a horizontal movement of the substrate in a horizontal plane when the substrate is split, and
    wherein the support member supports the substrate so as to be horizontally movable for displacement in an extended plane of the substrate when the substrate is split.

2. The brittle workpiece splitting system according to claim 1, wherein the processing unit sprays a coolant on the region of the substrate so as to cool the region.

3. The brittle workpiece splitting system according to claim 1, wherein the edge part to be clamped by the edge clamper has a width of 10 mm or less.

4. The brittle workpiece splitting system according to claim 1, wherein the elastic material is a resin.

5. The brittle workpiece splitting system according to claim 4, wherein the resin contains a fluoro-resin.

6. The brittle workpiece splitting system according to claim 1, wherein the deformable member includes a low-friction material.

7. The brittle workpiece splitting system according to claim 1, wherein the edge clamper includes a first resin member and a second resin member, in between which the substrate is clamped, the first and second resin members having a thickness no greater than 10 mm.

8. A brittle workpiece splitting method of splitting a substrate that is brittle by locally heating the substrate to cause a crack in the substrate via thermal stress induced in the substrate, said brittle workpiece splitting method comprising:
    holding a substrate, which is to be split, via a substrate holding mechanism; and
    splitting the substrate held via the substrate holding mechanism, the splitting including
        irradiating the substrate with a laser beam to locally heat the substrate, and
        moving a locally heated region on the substrate along an intended split line extending along an edge part of the substrate,
    wherein the substrate holding mechanism includes
        an edge clamper adapted to clamp the edge part of the substrate on opposite surfaces of the edge part, and
        a support member for supporting the substrate thereon from a surface of the substrate at a predetermined height, the support member being disposed on a first side of the surface of the substrate that is opposite a second side of the surface of the substrate whereon the edge clamper is clamped, the first and second sides of the substrate being opposite each other with respect to the intended split line, which is parallel to the edge part of the substrate,
    wherein at least a part of the edge clamper, which contacts the substrate, includes an elastic material having high rigidity, and a Young's modulus ranging from 300 MPa to 1300 MPa,
    wherein a part of the support member, which contacts the substrate, includes a plurality of deformable members that elastically deforms horizontally to permit a horizontal movement of the substrate in a horizontal plane when the substrate is split, and
    wherein the support member supports the substrate so as to be horizontally movable for displacement in an extended plane of the substrate when the substrate is split.

9. The brittle workpiece splitting method according to claim 8, wherein a coolant is sprayed on the locally heated region on the substrate to cool the locally heated region in the splitting step.

10. The brittle workpiece splitting method according to claim 8, wherein the edge part to be clamped by the edge clamper has a width of 10 mm or less.

11. The brittle workpiece splitting method according to claim 8, wherein the elastic material is a resin.

12. The brittle workpiece splitting method according to claim 11, wherein the resin contains a fluoro-resin.

13. The brittle workpiece splitting method according to claim 8, wherein the deformable member includes a low-friction material.

14. The brittle workpiece splitting method according to claim 8, wherein the edge clamper includes a first resin member and a second resin member, in between which the substrate is clamped, the first and second resin members having a thickness no greater than 10 mm.

* * * * *